(12) United States Patent
Williams

(10) Patent No.: US 10,147,029 B2
(45) Date of Patent: Dec. 4, 2018

(54) METHOD AND SYSTEM FOR PROVIDING INFORMATION FROM PRINT

(71) Applicant: SHOMI PTY LTD, Greensborough, Victoria (AU)

(72) Inventor: Tony Williams, Greensborough (AU)

(73) Assignee: SHOMI PTY LTD., Greensborough, Victoria (AU)

( * ) Notice: Subject to any disclaimer, the term of this patent is extended or adjusted under 35 U.S.C. 154(b) by 172 days.

(21) Appl. No.: 14/901,211

(22) PCT Filed: Jul. 4, 2014

(86) PCT No.: PCT/AU2014/050112
§ 371 (c)(1),
(2) Date: Dec. 28, 2015

(87) PCT Pub. No.: WO2015/003222
PCT Pub. Date: Jan. 15, 2015

(65) Prior Publication Data
US 2016/0155034 A1    Jun. 2, 2016

(30) Foreign Application Priority Data

Jul. 8, 2013  (AU) ............................... 2013902514

(51) Int. Cl.
*G06F 15/16*     (2006.01)
*G06K 19/06*     (2006.01)
(Continued)

(52) U.S. Cl.
CPC .  *G06K 19/06037* (2013.01); *G06F 17/30879* (2013.01); *G06F 17/30893* (2013.01);
(Continued)

(58) Field of Classification Search
CPC ........ G06K 19/06037; G06F 17/30893; G06F 17/30905; G06F 17/30879
See application file for complete search history.

(56) References Cited

U.S. PATENT DOCUMENTS

| 4,824,266 A | * | 4/1989 | Fujii ..................... G06K 1/121 |
| | | | 358/1.11 |
| 5,591,956 A | * | 1/1997 | Longacre, Jr. ..... G06K 7/10851 |
| | | | 235/462.09 |

(Continued)

FOREIGN PATENT DOCUMENTS

| EP | 1043670 A2 * 10/2000 ....... G06F 17/30879 |
| EP | 2474888         7/2012 |

OTHER PUBLICATIONS

International Search Report and Written Opinion issued in corresponding International Application No. PCT/AU2014/050112 dated Oct. 15, 2014.

*Primary Examiner* — Padma Mundur
(74) *Attorney, Agent, or Firm* — Hogan Lovells US LLP

(57) ABSTRACT

A method for providing content data to a user device, the method comprising the steps of: obtaining a reference code from the user device, the reference code corresponding to a printed or displayed linear code; identifying a reference within a content database corresponding to the reference code; identifying content data associated with the reference; and communicating the content data to the user device. Also disclosed is a content server for providing content, and a method for generating unique reference codes.

19 Claims, 9 Drawing Sheets

...Lorem ipsum dolor sit amet, consectetur adipiscing elit. Quisque sed vestibulum est, vel lobortis elit(▶ ▪ ▪▪ ▪▪ ▪ ▪). Cras in aliquet nulla. Donec condimentum, felis a vulputate rhoncus, quam eros convallis lectus, vel...

(51) Int. Cl.
*G06F 17/30* (2006.01)
*H04L 29/08* (2006.01)
*H04L 29/06* (2006.01)

(52) U.S. Cl.
CPC ........ G06F 17/30905 (2013.01); H04L 67/10 (2013.01); H04L 67/42 (2013.01)

(56) References Cited

U.S. PATENT DOCUMENTS

| | | | |
|---|---|---|---|
| 5,764,774 A * | 6/1998 | Liu | H04L 9/00 235/435 |
| 2003/0112120 A1 * | 6/2003 | K | G05B 19/0425 340/5.53 |
| 2009/0108057 A1 | 4/2009 | Mu et al. | |
| 2009/0251277 A1 * | 10/2009 | O'Hara | G06Q 30/02 340/5.1 |
| 2012/0199647 A1 * | 8/2012 | Hwang | G06Q 10/087 235/375 |
| 2013/0162400 A1 | 6/2013 | Nikolaus et al. | |
| 2013/0321554 A1 * | 12/2013 | Martinsen | H04N 7/147 348/14.02 |

* cited by examiner

26

28

Lorem ipsum dolor sit amet, consectetur adipiscing elit. Quisque sed vestibulum est, vel lobortis elit. Cras in aliquet nulla. Donec condimentum, felis a vulputate rhoncus, quam eros convallis lectus, vel aliquam nibh ante a odio. Vivamus commodo est eu ante interdum ultricies. Sed mollis odio erat, sagittis sodales orci aliquam sit amet. Curabitur quam turpis, egestas ac neque eu, posuere feugiat nibh. Curabitur ullamcorper bibendum pharetra. Phasellus elementum dolor sit amet pulvinar feugiat. Pellentesque at magna sed sem adipiscing porta. Curabitur cursus vulputate libero vitae volutpat. Sed ac ipsum quis justo adipiscing molestie sit amet a nisl. Morbi tristique vestibulum sollicitudin. ▶ ⋰⋱ ⋮⋮ ▌ ← 30

Nam venenatis bibendum nisi a pellentesque. In volutpat tortor ac volutpat tempus. Nulla mauris dolor, placerat at vulputate id, aliquet rutrum purus. Ut imperdiet condimentum placerat. Nam tristique ligula consequat ullamcorper molestie. Sed justo diam, facilisis id odio ut, ullamcorper euismod Lorem ipsum dolor sit amet, consectetur

Figure 3

...Lorem ipsum dolor sit amet, consectetur adipiscing elit. Quisque sed vestibulum est, vel lobortis elit(). Cras in aliquet nulla. Donec condimentum, felis a vulputate rhoncus, quam eros convallis lectus, vel...

METHOD AND SYSTEM FOR PROVIDING INFORMATION FROM PRINT

CROSS REFERENCE TO RELATED APPLICATIONS

This application is a 35 U.S.C. 371 National Stage of International Application No. PCT/AU2014/050112, titled "METHOD AND SYSTEM FOR PROVIDING INFORMATION FROM PRINT", filed on Jul. 4, 2014, which claims priority to Australian Application No. 2013902514, titled "METHOD AND SYSTEM FOR PROVIDING INFORMATION FROM PRINT", filed on Jul. 8, 2013, all of which are incorporated by reference herein in their entirety.

FIELD OF THE INVENTION

The invention generally relates to provision of content to users.

BACKGROUND TO THE INVENTION

Since the advent of the Internet, a difficulty faced by content providers is allowing users to easily access the content without having to enter complex data into their user devices, for example http addresses. Users may be discouraged from accessing content when they are required to enter a content address into a user device, such as a mobile phone.

A user may be presented with the option of accessing content through non-electronic means, or at least via means incapable of providing hyperlink access. Examples of such means include text books, billboards, leaflets, and other printed materials. Other examples include images or other information presented on a screen of a computing device which are available for viewing by the user, though not necessarily interaction (for example, the user cannot use a web browser operating on the computer, and instead must use their own user device which is separate to the computer device).

One known system utilises QR-codes, which are 2-dimensional printed or displayed codes that can encode hyperlinks. A user device such as a mobile phone is configured to capture an image of the QR-code, identify the QR-code, decode the QR-code, and in the case where a QR-code encodes a hyperlink, the user device is configured to access the web address of the hyperlink. Being 2-dimensional in nature, QR-codes are not well suited for presentation in text documents, as they disrupt the flow and formatting of the text. Further, as QR-codes directly encode a hyperlink, they are not suited to encoding information that changes over time.

SUMMARY OF THE INVENTION

According to a first aspect of the present invention, there is provided a method for providing content data to a user device, the method comprising the steps of: obtaining a reference code from the user device, the reference code corresponding to a printed or displayed linear code; identifying a reference within a content database corresponding to the reference code; identifying content data associated with the reference; and communicating the content data to the user device.

A linear code is a visual code associated with a reference code. When displayed, the linear code is advantageously suitable for presentation in-line with text, minimising, preferably eliminating, formatting changes such as line spacing, required to accommodate the linear code within the text. The linear code advantageously includes a 1-dimensional arrangement of code characters, as described herein.

According to a second aspect of the present invention, there is provided a content server comprising a processor, a first memory and a second memory, the second memory configured for storing instructions for execution by the processor, said instructions configured to cause the processor to execute the method of: obtaining a reference code from the user device, the reference code corresponding to a printed or displayed linear code; identifying a reference within a content database corresponding to the reference code; identifying content data associated with the reference; and communicating the content data to the user device.

Preferably, the reference code is received from the user device. Alternatively, an image of the linear code may be received from the user device, and the method may further comprise the steps of identifying the linear code within the image; and determining the reference code associated with the linear code.

In embodiments, the method further comprises the step of providing a server comprising the content database, wherein the server is configured for obtaining the reference code, identifying the reference, and identifying the content data. Optionally, the server is in network communication with the user device, and the server utilises the network to obtain the reference code and communicate the content data.

Preferably, the printed or displayed linear code is photographed by the user device. The linear code may be a printed linear code. Alternatively, the linear code may be a displayed linear code. The linear code is preferably located in-line with a printed or displayed text.

The content data optionally comprises a web address, or alternatively, the content data may comprise multimedia data.

In embodiments, the linear code comprises: a registry character; one or more code characters, each code character comprising an arrangement of subregions. Preferably, the linear code comprises seven code characters. Optionally, each code character comprises an arrangement of eight subregions, arranged in two columns of four subregions. Each subregion of each cork character may be selected from one of two states, preferably two contrasting colours, such that each code character uniquely encodes a number. Each code character preferably comprises at least one subregion with a colour different to the colour of the underlying substrate.

Optionally, the reference code comprises one or more numbers, each number uniquely associated with one of the one or more code characters.

In embodiments, the identified content data is selected from a plurality of content data associated with the reference code based on a property of the user device. In this case the method may further comprise the steps of receiving one or more user device identifiers; and determining a content data from the plurality of content data based on the one or more user device identifiers.

Optionally, the reference code comprises an encrypted identifier, and the method further comprises the step of decrypting the reference code.

The content data is preferably configured to cause the user device to present the content data or an associated data automatically.

According to a third aspect of the present invention, there is provided a method for generating a linear code, the linear code comprising an ordering of one or more code characters, comprising the steps of determining an associated reference code; determining a number associated with the, or each, code character, such that the one or more numbers corresponds to the reference code; for each code character; determining a base-b representation of the associated number; determining an arrangement of a plurality (N) of subregions of the code character, wherein each subregion is uniquely associated with a digit of the base-b representation; and associating each subregion associated with each digit a colour, corresponding with a value, of the associated digit presenting the linear code comprising the ordered of one or more code, characters.

According to a fourth aspect of the present invention, there is provided a linear code generator for generating a linear code comprising an ordering of one or more code characters, comprising a processor, a first memory and a second memory, the second memory configured for storing instructions for execution by the processor, said instructions configured to cause the processor to execute the method comprising the steps of determining an associated reference code; determining a number associated with the, or each, code character, such that the one or more numbers corresponds to or is equal to the reference code; for each code character: determining a binary representation of the associated number; determining an arrangement of a plurality of subregions of the code character, wherein each subregion is uniquely associated with a bit of the binary representation; and associating each subregion associated with a first bit value a first colour, and each subregion associated with a second bit value a second colour, presenting the linear code comprising the ordered of one or more code characters.

In embodiments, the step of determining an associated reference code comprises: randomly generating a provisional reference code; comparing the provisional reference code to a used reference database comprising a record of used reference codes; determining that the provisional reference code is not equal to any used reference code of the used reference database; and assigning the provisional reference code as the associated reference code.

Each reference code may comprise an ordered selection of one or more numbers corresponding to the ordered selection of one or more code character. Each number may have a value selected from 255 values. The binary representation of each number may be an 8-bit binary (N=8, h=2) representation. Preferably, each code character comprises an even number of subregions, and the subregions are arranged in two equal columns. For example, each code character comprises an equal number of subregions.

Optionally, the base-b representation is a binary representation, the colours corresponding with each digit compose first and second colours. The first colour may be black and the second colour may be white. In an alternative, the first colour is a solid colour, and the second colour is transparent.

In embodiments, the presentation step comprises the step of: printing the linear code onto a printing substrate. In other embodiments, the presentation step comprises the step of: displaying the linear code on a transitory medium.

Optionally, the linear code further comprises one or more registry characters, preferably one registry character, and the method comprises the step of determining the registry character.

Each registry character may be predetermined. Alternatively, the registry character is determined based on, at least in part, the determined code characters of the linear code.

According to a fifth aspect of the present invention, there is provided a method for capturing and actioning a linear code, comprising the steps of: utilising a user device to obtain an image of a printed or displayed linear code; utilising image recognition functionality of the user device to determine a reference code associated with the linear code; communicating the reference code to a reference server using a network; receiving, via a network, content data from the reference server, said content data associated with the linear code.

According to a related aspect of the present invention, there is provided a method for capturing and actioning a linear code, comprising the steps of: utilising a user device to obtain an image of a printed or displayed linear code; communicating the image of the linear code to a reference server using a network; receiving, via a network, content data from the reference server, said content data associated with the linear code.

According to yet another aspect of the present invention, there is provided a user device configured for implementing the method either of the previous aspects.

BRIEF DESCRIPTION OF THE DRAWINGS

Embodiments of the invention will now be described with reference to the accompanying drawings. It is to be appreciated that the embodiments are given by way of illustration only and the invention is not limited by this illustration. In the drawings:

FIG. 3 shows a document including a linear code and text regions;

DESCRIPTION OF PREFERRED EMBODIMENT

Figure 1:
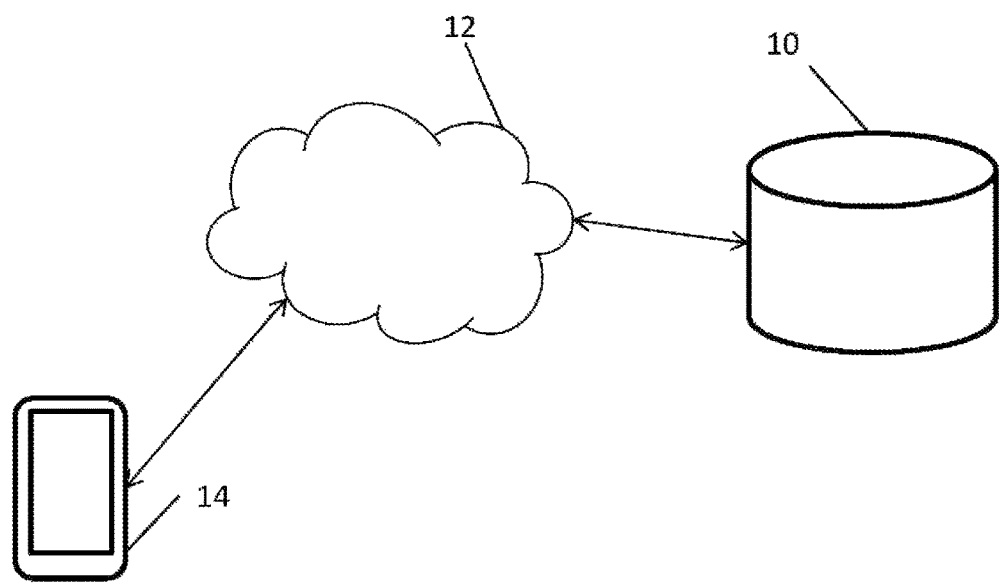
FIG. 1 shows a user device in network communication with a server.

Referring to FIG. 1, there is shown a server 10 and user device 14, each in network communication with a network 12, such as the Internet. The user device 14 is preferably, as assumed herein, a mobile phone comprising a camera and means for communicating with the network 12. The mobile phone 14 can be in communication with the network 12 via usual network standards, for example wireless standards such as GPRS, LTE, WLAN, Bluetooth etc., and wired standards, such as Ethernet, USB, Firewire, etc. It is understood that other user devices 14 can be utilised, in particular computing devices, which are adapted to identify visual information and communicate with the server 10 as described herein. It is also envisaged that the user device 14 could be a wearable device with network connectivity, such as Google Glass™.

Figure 2:
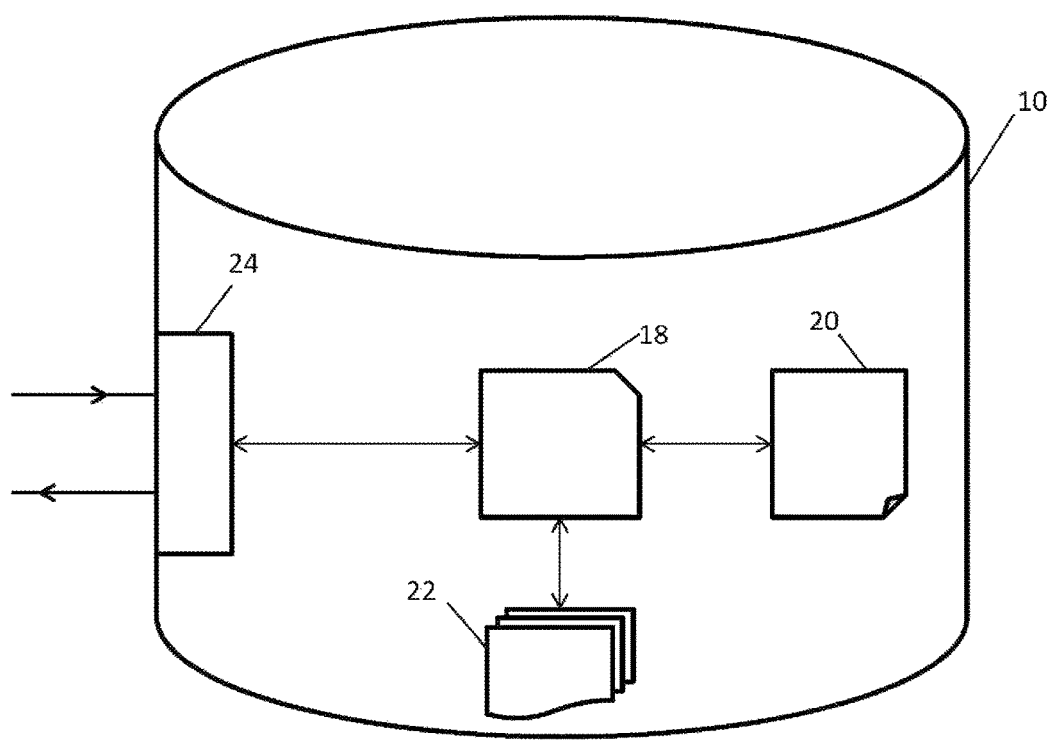
FIG. 2 shows a schematic view of a exemplary server.

FIG. 2 shows a schematic of an implementation of the server 10. The server 10 comprises a processor 18 configured for processing instructions stored within a first memory 20. The first memory 30 can comprise a volatile memory, such as a dynamic memory (DRAM) and/or a non-volatile memory such as a Solid State Drive (SSD) or a magnetic hard disk drive (HDD). For example, instructions can be held in non-volatile memory until required by processor 18, at which time, or beforehand in anticipation, the instructions are copied or moved from the non-volatile memory into the volatile memory. A second memory 22 is provided for storing data, optionally in data structures such as a database. The second memory 22 can comprise volatile memory and/or non-volatile memory. The second memory 22 includes at least a content database containing content data and, for each content data, an associated reference. The second memory 22 can be the same or different physical memory as the first memory 20.

A network interface 24 is further provided in communication with the processor 18. The network interface 24 can be a wired interface, such as Ethernet, and/or a wireless interface, such as WLAN, interface. The network interface 24 can comprise one or a plurality of physical network interfaces, and is configured for both receiving and sending network data to the network 12.

Referring to FIG. 3, a document 26 is provided including text regions 28 and a linear code 30. The text regions 28 can be, for example, in-line text prepared using a word processor and printed onto paper, presented on a monitor, or provided using other suitable presentation means. The document 26 is can therefore be a physical non-transitory document, such as text printed onto a paper or other substrate, for example one of a newspaper, magazine, advertisement, etc., or a document presented on a transitory medium, such as LCD, LED, and/or CRT displays, and e-ink displays. The linear code 30 can advantageously be arranged such that the linear code 30 is located in line with the in-line text, minimising, preferably eliminating, formatting changes such as line spacing, required to accommodate the code.

Figure 4A:
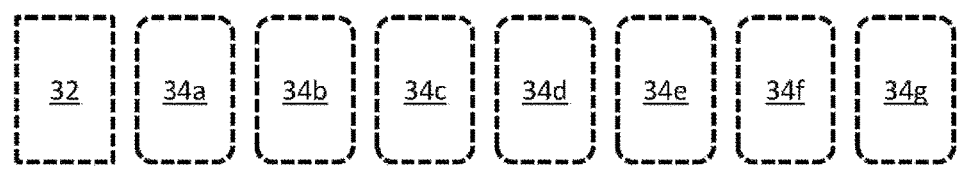
FIG. 4a shows positions of a registry character and code characters, according to embodiments.

Referring to FIG. 4a, the linear code 30 according to an embodiment is shown. The linear code 30 comprises a registry character 32 and one or more code characters 34a-f. The registry character 32 is, for all linear codes 30 generated according to the present embodiment, the left-most character of the linear code 30. The one or more code characters 34 are then located sequentially to the right of the registry character 32. It is understood that other embodiments may have the registry character 32 located in other positions within the linear code 30. In some embodiments, for example, the linear code 30 is a vertical code, with the registry character 32 located at the top of the linear code 30 and the one or more code characters 34 sequentially arranged descending from the registry character 32. In still other embodiments, the registry character 32 is varied to indicate the relative location of the sequentially arranged one or more code characters 34. Herein, it is assumed that every linear code 30 comprises a registry character 32 and seven code characters 34 arranged sequentially to the right of the registry character 32. In variations, the registry character 32 comprises information indicating how many code characters 34 are present. In still further embodiments, a registry character 32 is not required, and the code is identified and correctly processed based on the code characters 34. In embodiments, the registry character 32 is different in appearance to all passable code characters 34.

Figure 4B:
FIG. 4b shows a linear code according to embodiments.

Referring to FIG. 4b, an example linear code 30 is shown. In the present case, the registry character 32 always has the same appearance, and therefore only the code characters 34 are varied. The code characters 34a-34g each represent a number. As it is preferable to avoid code characters 34 being punted with only white squares, each code character 34 in the present embodiment can be selected from $2^8-1=255$ combinations of black and white squares. Therefore, each seven code character 34 linear code 30 can encode approximately $7.0 \times 10^{16}$ different values. It is understood that it is not necessary for the squares to be selected from black and white, and other colour combinations can be incorporated. Preferably, the two colours chosen are sufficiently contrasting with one another that the colours can be distinguished, such as by the user device 14. It is also understood that one of the colours, for example white, can in fact correspond to an absence of printing, and thereby appears as the underlying substrate.

Figure 4C:
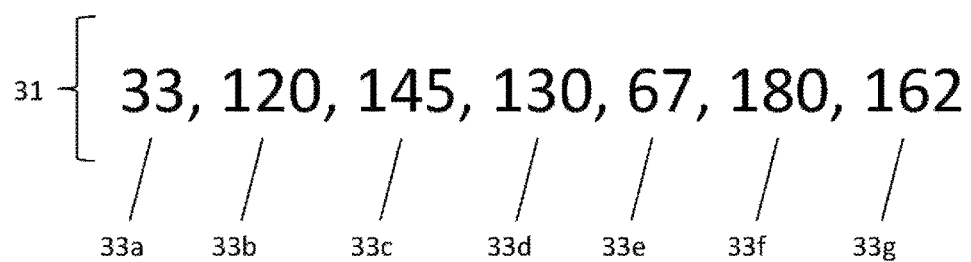
FIG. 4c shows a reference code including corresponding numerical values to the code characters of FIG. 4b.

Referring to FIG. 4c, the linear code 30 is uniquely associated with a reference code 31. Herein, the reference code 31 is represented as a group of seven numbers 33a-g that may each take a value between 1 and 255 (or 0 and 254, it is understood that either representation is equivalent). Therefore, each number 33 is associated with a code character 134.

Figure 5:
FIG. 5 shows the components of a code character according to embodiments.

Referring to FIG. 5, each individual code character 34 is divided into eight subregions 36, wherein each subregion 36 corresponds to a bit of an eight bit representation of the associated number 33. The top left subregion 36a corresponds to the least significant bit ($b_0$), and the bottom right subregion 36h to the most significant bit ($b_7$), with the remaining subregions corresponding to each bit as indicated in the figure. For each subregion 36a-h, if the corresponding bit value is 1, the square is coloured black, and if the corresponding bit value is 0, the square is coloured white. In other embodiments, each code character 34 can be divided into a different number of subregions 36. In general, each code character 34 can be divided into 'N' subregions 36. Preferably, each code character 34 is divided into an even number of subregions 36.

Figure 6:
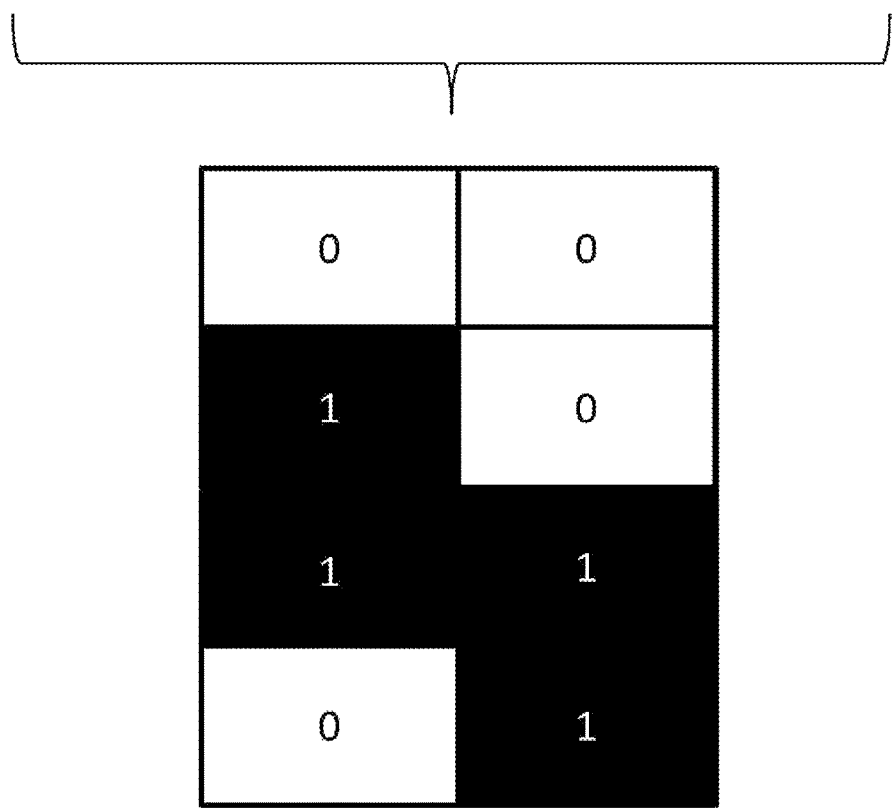
FIG. 6 shows a technique for creating a code character.

FIG. 6 shows a worked example for the binary representation of the base-10 number "180" ($10100111_2$). The top left subregion 36a (see FIG. 5 for numerical references) is coloured black to represent the least significant bit ($b_0$), which has the value 1. Each subregion 36 is therefore coloured black when its corresponding bit value is 1, and white when the bit value is 0. The resulting code character 34 is therefore uniquely associated with the number 167.

The linear code 30 is determined by first identifying a suitable reference code 31, which may be randomly selected or provided as described herein. Each number 33 of the reference code 31 (sec FIG. 4c) is then converted into a Wintry number, if required. A code character 34 is then determined for each number 33, for example according to the method described with reference to FIGS. 5 and 6. Where applicable, a registry character 32 is also provided and, if necessary, determined in light of the properties of the linear code 30 etc. Each code character 34 is provided in the order of the corresponding numbers 33 of the reference code 31. In an embodiment, each code character 34 is predefined and stored as a computer font. Each code character 34 can then be selected based on a lookup table comprising the code characters 34 and associated numbers.

Figure 7:
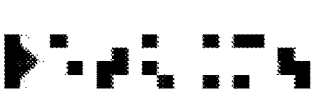
FIG. 7 shows a text with a linear code presented in-line with other text.

FIG. 7 shows an example of a printed text 40, including text regions 28 and a linear code 30. As is shown, the linear code 30 does not cause a change in line spacing of the text of the text regions 28. This can be advantageous when compared to prior art printed codes, which are not configured for printing in-line with the surrounding text, and therefore create a disjointed reading experience.

Figure 8:
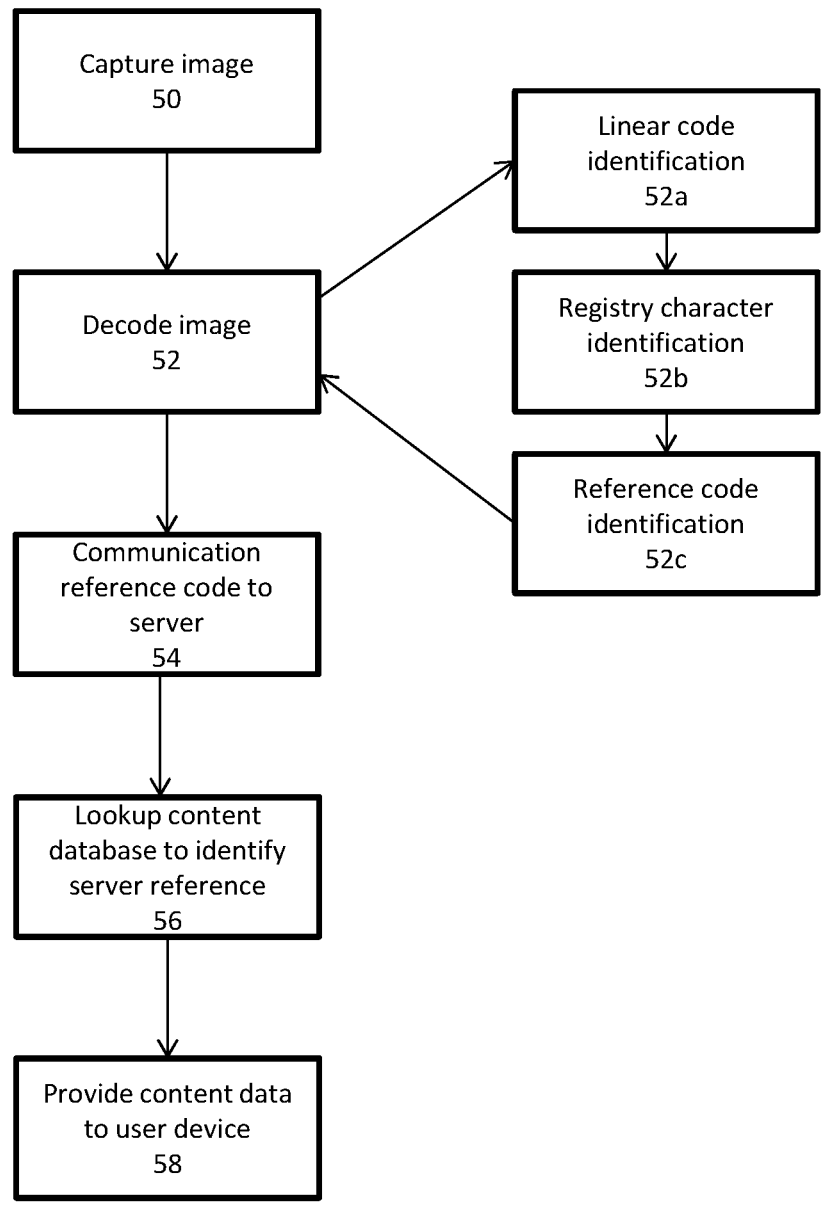
FIG. 8 shows a method for providing content associated with a linear code.

Referring to FIG. 8, in order to utilise a printed linear code 30, a user, such as a person reading the document 26 containing a linear code 30, can capture an image of the linear code 30 using a user device 14 at capture step 50. Techniques to capture the image 40 are described below, but in general the result is a binary representation of the linear code 30 stored within a memory of the user device 14. The binary representation of the linear code 30 therefore corresponds to the reference code 31. During the capture step 50, the linear code 30 is imaged along with any surrounding graphics and/or text, should such be present. In this way, according to embodiments, the capture step 50 simply corresponds to utilisation of a camera of the user device 14.

Decoding step 52 corresponds to a processor of the user device 14 performing actions to first identify the linear code 30 from any surrounding graphics and/or text at linear code identification sub-step 52a. Next, the processor is utilised to identify the registry character 32 for implementations utilising a registry character 32 at registry identification sub-step 52b. Finally, the processor is utilised to identify the reference code 31 encoded within the linear code 30, at code identification sub-step 52c. The reference code 31 is identified by first determining the relative position of each code character 34, such that the code characters 34 are correctly associated with each number 33 of the reference code 31, and subsequently determining the colour of each subregion 36 of each code character 34 to determine the value of each number 33. The reference code 31 is then communicated at communication step 54 to the server 10, via the network 12.

The decoding step 52 can instead be undertaken by more than one processor. For example, the initial linear code identification sub-step 52a may occur on the user device 14, whereas the subsequent registry identification sub-step 52b and code identification sub-step 52c occurs on the server 10, or another computing device. In a particular embodiment, the user device 14 communicates the image obtained of the linear code 30 and surrounding graphics and/or text to the server 10, which then undertakes the decoding step 52. In these embodiments, the communication step 54 occurs before the decoding step 52, and corresponds to the communication of the image.

The server 10 is configured to identify content associated with the reference code 31, and therefore associated with the linear code 14 that has been imaged. At lookup step 56, the server 10 searches the content database of the second memory 22 to identify a server reference corresponding to the reference code 31. In the present embodiment, a corresponding server reference is simply equal to the reference code 31. The corresponding server reference is uniquely associated with a corresponding content data, and therefore identification of the corresponding reference results in identification of the corresponding content data.

After identifying the corresponding content data, the server 10 is configured to provide the content data to the user device 14 through communication via the network 12 at provision step 58. The content data can comprise, for example, one or more of: a hyperlink; video, sound, and/or other multimedia content; an application for installation on the user device; and other suitable content for communication over the network 12.

The user device 14 can be configured to automatically present the content data, or presentation data associated with the content data, to a user of the user device 14. Examples of different content data and presentation data are described below.

Example 1: Web Link

In the present example, the content data associated with the linear code 30 is a web address. Upon receiving the reference code 31 corresponding to the imaged linear code 30, the web address is identified within the content database and is then communicated through the network 12 to the user device 14. Preferably, the user device 14 is configured such that upon receiving the web address from the server 10, the website corresponding to the wish address is automatically loaded onto the user device 14 and thereby presented to a user of the user device 14. In this way, the user is presented with the website as a consequence of imaging the linear code 30, and therefore is advantageously unaware of the network communications between the user device 14 and the server 10. Alternatively, instead of a web address, the content data is a link to an app of an app store, or other online facility.

Example 2: Multimedia Content

In this example, the content data associated with the linear code 30 is media data, such as an audio file or a video file. Upon receiving the reference code 31 corresponding to the imaged linear code 30, the media data is identified within the content database and is then communicated through the network 12 to the user device 14. Preferably, the user device 14 is configured such that upon receiving the media data from the server 10, the media is automatically presented to the user of the user device 14, such as by playing the audio and/or video of the media data using the user device 14. In this way, like the first example, the user is presented with the media data as a consequence of imaging the linear code 30, and therefore is advantageously unaware of the network communications between the user device 14 and the server 10.

In embodiments, the server 10 is configured for further analysis in order to determine a correct or appropriate content data to communicate to the user device 14 from a collection of content data associated with the same server reference. Such further analysis can rely upon receipt, via the network 12, of further information related to the user device 14 and/or the user of the user device 14. For example, the user device 14 can transmit, along with the reference code 31 or linear code 30 image, or in response to a request from the server 10 subsequent to the transmission of the reference code 31 or linear code 30 image, user device 14 and/or user identifying information, such as one or more of: user device hardware information; user device software information; and user information. Receipt of such further information can allow the server 10 to determine a most appropriate content data for communication to the user device 14 out of the collection of content data. The further analysis can also, in conjunction with or separately to the receipt of further information, rely upon a random selection of content data. In some embodiments, when the further information is not associated specifically with a particular content data, a default or alternate content data is delivered to the user device 14. An example of the present embodiments is described in example 3 below.

Example 3: Application

In this example, the content data associated with the linear code 30 is an application for installation on the user device 14. Upon receiving reference code 31 corresponding to the imaged linear code 30, the application data for installation is identified within the content database and is then communicated through the network 12 to the user device 14. The server 10 is configured for identifying the correct application data from a plurality of application data, which is configured for the particular user device 14 which is to receive the application data. Preferably, the user device 14 is configured such that upon receiving the application data from the server 10, the application is automatically installed onto the user device 14. In this way, like the previous examples, the user is advantageously not aware of the network communications, and instead perceives the application being installed as a consequence only of the imaging of the linear code 30.

In embodiments, the content data communicated to the user device 14 is at least in part selected based on additional information stored within the server 10 about previous content data provided in respect of a particular reference code 31. For example, should a particular user device 14 communicate the same linear code 30 or reference code 31 on more than one occasion, the server 10 is configured to provide a different content data on the second (and possibly subsequent) occasions compared to the first occasion. This may be particularly suitable for 'one-use' applications. In another example, the content data communicated to a user device 14 changes after a preselected number of user devices 10 have communicated a linear code 30 or reference code 31. This may be particularly suitable for implement where a first preselected number of user devices 14 are to receive a particular content data.

Figure 9:
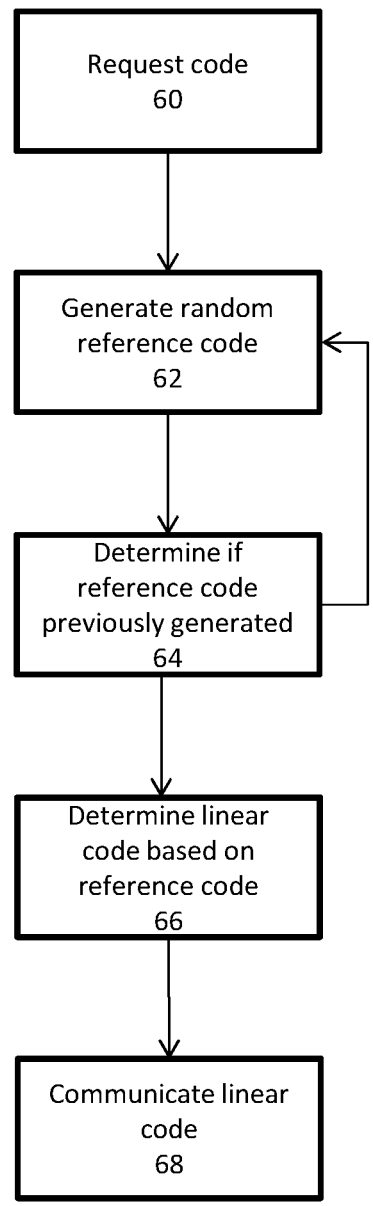
FIG. 9 shows a method for selecting a linear code.

Referring to FIG. 9, a method for identifying a suitable linear code 30 is shown. At code request step 60, a request is received at the server 10 from a requesting entity (such as a publisher) for a linear code 30. The server 10 then generates a random reference code 31 at generation step 62, and determines if the generated reference code 31 has previously been generated (for example, by comparing to a database comprising previously generated reference codes 31), at determination step 64. If the reference code 31 has previously been generated, then the server 10 returns to generation step 62. If the reference code 31 has not been previously generated, then a linear code 30 is determined based on the reference code 31, and linear code determination step 66. This linear code 30 is then communicated to the requesting entity at linear code communication step 68. In this way, the requesting entity is not made aware of the reference code 31 associated with the linear code 30.

In a variation of the embodiments described herein, the set of code characters 34 available is restricted to provide advantageous print and/or identification properties. In a particular variation, only code characters 34 including at least one black subregion 36 (i.e. printed subregion 36) on each side of the code character 34 are allowed. This may advantageously reduce the risk that adjacent code characters 34 are interpreted as a single code character 34.

Each number 33 of the reference code 31 may first be encrypted before generation of the associated linear code 30. This will require that a decryption algorithm is performed on the values determined from printed linear codes 30 before the lookup step 56. In embodiments, the registry character 32 is varied to indicate whether the linear code 30 corresponds to an encrypted reference code 31 or an unencrypted reference code 31. Encryption may advantageously reduce the likelihood of the algorithms for generating linear codes 30 being reverse engineered.

As the linear code 30 does not directly encode content information, the content information associated with the linear code 30 can be advantageously changed without having to change the already printed linear code 30. This is achieved simply by changing the content information associated with the server reference corresponding to the reference code 31 associated with the linear code 30.

It is understood that, in some embodiments, the code characters 34 correspond to a different base representation than the base-2 binary representation described herein. In general, for a base-b representation, where 'b' is the number of unique digits used to represent numbers in the representation, each subregion 36 of each code character 34 can be coloured one of 'b' different colours. For example, in a b=3 representations, each subregion 36 can be coloured one of: red, blue, and green.

For a generalised linear code 30 having 'M' code characters 34, 'N' subregions 36 per code character 34, which a base-b representation, the number of different linear code 30 permutations can be calculated as:

$$\text{permutations(linear code)} = (b^N)^M$$

In embodiments where there is a restriction that each code character 34 cannot contain subregions 36 all coloured at particular colour (such as white), the number of different linear code 30 permutations can be calculated as:

$$\text{permutations(linear code)} = (b^N - 1)^M$$

Further modifications and improvements may be made without departing from the scope of the present invention.

That claimed is:

1. A method for providing content data to a user device, the method comprising the steps of:
   providing a server comprising a content database, wherein the server is in network communication with the user device;
   the server obtaining via the network, a reference code from the user device, the reference code corresponding to a printed or displayed linear code, wherein the linear code comprises a sequence of code characters corresponding to a sequence of character bit values of the reference code, wherein each code character is a computer font character having a visual appearance formed by a pattern of subregions, each subregion containing one of a plurality of colors, and each subregion corresponding to a character bit such that the pattern of subregions corresponds to a sequence of character bits for determining a character bit value included in the reference code;
   the server identifying a server reference within the content database corresponding to the reference code, the server reference being uniquely associated with corresponding content data in the content database;
   the server identifying the corresponding content data associated with the server reference; and
   the server communicating the identified content data from the content database to the user device via the network;
   wherein the printed or displayed linear code is distinct from a direct encoding of the corresponding content data; and
   wherein the corresponding content data uniquely associated with the server reference corresponding to the reference code, is changeable without changing the printed or displayed linear code.

2. The method as claimed in claim 1, wherein the printed or displayed linear code is located in-line with a printed or displayed text, respectively.

3. The method as claimed in claim 1, wherein the linear code comprises:
   a registry character;
   one or more code characters, each code character comprising an arrangement of subregions.

4. The method as claimed in claim 3, wherein the pattern comprises eight subregions, arranged in two columns of four subregions.

5. The method as claimed in claim 3, wherein the reference code comprises one or more numbers, each number uniquely associated with one of the one or more code characters.

6. The method as claimed in claim 1, wherein the identified content data is selected from a plurality of content data associated with the reference code based on a property of the user device, and the method comprises the steps of receiving one or more user device identifiers and determining a content data from the plurality of content data based on the one or more user device identifiers.

7. The method as claimed in claim 1, wherein the reference code comprises an encrypted identifier, and the method further comprising the step of: decrypting the reference code.

8. The method as claimed in claim 1, wherein the content data is configured to cause the user device to present the content data or an associated data automatically.

9. A method for generating a linear code from an associated reference code comprising an ordered selection of one or more numbers, the linear code comprising a sequence of code characters corresponding to a sequence of character bit values of the associated reference code, the method comprising the steps of:
   determining an associated reference code from which the linear code is to be generated;
   determining a sequence of character bit values associated with the sequence of code characters of the linear code, such that the determined numbers for the sequence of code characters corresponds to the sequence of numbers of the reference code,
   for each code character of the linear code:
      determining a base-b representation of the associated character bit value;
      determining an arrangement of a plurality (N) of subregions of the code character, wherein each subregion is uniquely associated with a character bit of the base-b representation;
      associating each subregion associated with each character bit a color, corresponding with a value of the associated character bit; and
      storing the code character as a computer font character having a visual appearance formed by the arrangement of subregions, and the computer font character is configured for presentation in-line with surrounding text; and
   presenting the linear code comprising the ordered one or more code characters in-line with the surrounding text.

10. The method as claimed in claim 9, wherein the step of determining an associated reference code comprises:
   randomly generating a provisional reference code;
   comparing the provisional reference code to a used reference database comprising a record of used reference codes;
   determining that the provisional reference code is not equal to any used reference code of the used reference database; and
   assigning the provisional reference code as the associated reference code.

11. The method as claimed in claim 9, wherein the base-b representation is a binary representation, and wherein the colors corresponding with each character bit comprise first and second colors.

12. The method as claimed in claim 9, wherein the linear code further comprises one or more registry characters and the method further comprising the step of determining the registry character.

13. The method as claimed in claim 12, wherein the registry character is one of predetermined or determined based on, at least in part, the determined code characters of the linear code.

14. A linear code generator for generating a linear code from an associated reference code comprising a sequence of numbers, the linear code comprising a sequence of code characters corresponding to the sequence of character bit values of the associated reference code, the linear code generator comprising a computer processor, first memory and second memory, the second memory configured for storing computer-executable instructions for execution by the computer processor, said computer-executable instructions configured to cause the computer processor to execute the method comprising the steps of:
   determining an associated reference code from which the linear code is to be generated;
   determining a sequence of character bit values associated with the sequence of code characters of the linear code, such that the sequence of determined character bit values corresponds to the sequence of character bit values of the reference code;
   for each code character of the linear code:
      determining a binary representation of the associated character bit value;
      determining an arrangement of a plurality of subregions of the code character, wherein each subregion is uniquely associated with a bit of the binary representation; and
      associating each subregion associated with a first bit value a first color, and each subregion associated with a second bit value a second color,
      presenting the linear code comprising the ordered one or more code characters;
   wherein each code character is a computer font character having a visual appearance formed by the arrangement of subregions.

15. The method as claimed in claim 1, wherein the corresponding content data includes any one from the group consisting of: web address, hyperlink, multimedia or media data, and application data for installation.

16. The method as claimed in claim 1, wherein the printed or displayed linear code is a one-dimensional arrangement of the code characters.

17. The method as claimed in claim 1, wherein the printed or displayed linear code is arranged horizontal or vertical direction.

18. The method as claimed in claim 1, wherein one colour of the plurality of colours is a colour of an underlying substrate that the linear code is printed or displayed on.

19. The method as claimed in claim 1, wherein the sequence of character bits is a binary representation.

* * * * *